United States Patent

[11] 3,607,039

[72] Inventors Leo A. Miller;
  James A. Taylor, both of Lakeland, Fla.
[21] Appl. No. 786,755
[22] Filed Dec. 24, 1968
[45] Patented Sept. 21, 1971
[73] Assignee Wellman-Lord, Inc.

[54] PROCESS FOR RECOVERING SULFUR DIOXIDE FROM AN SULFUR DIOXIDE-CONTAINING GAS
  11 Claims, No Drawings
[52] U.S. Cl. ................................................... 23/178,
  23/2, 23/300
[51] Int. Cl. ........................................................ C01b 17/60
[50] Field of Search ............................................ 23/2, 114,
  130, 131, 177, 178, 178 S, 300, 302

[56] References Cited
  UNITED STATES PATENTS
2,913,309  11/1959  Sandborn et al. ............  23/131 X
  FOREIGN PATENTS
418,255  10/1934  England ......................  23/177

OTHER REFERENCES

Morrison, Organic Chemistry. p. 632 (Allyn & Bacon 1959)

Primary Examiner—Oscar R. Vertiz
Assistant Examiner—Charles B. Rodman
Attorneys—John W. Behringer, Eugene L. Bernard, Martin J. Brown, James N. Dresser, W. Brown Morton, Jr., John T. Roberts, Malcolm L. Sutherland and Morton, Bernard, Brown, Roberts & Sutherland ABSTRACT: In a process for recovering $SO_2$ from an $SO_2$-containing gas, e.g. flue gas, by contacting the gas with an aqueous solution of a metal sulfite such as potassium, cesium, and rubidium sulfite to produce an aqueous solution of the corresponding metal bisulfite which is a precursor of $SO_2$, recovering the metal bisulfite therefrom and transforming it into the corresponding metal pyrosulfite, and treating the metal pyrosulfite to produce $SO_2$, the improvement wherein the metal bisulfite is recovered and transformed into the corresponding metal pyrosulfite by contacting the precursor-containing solution with an organic carbonyl compound to form a metastable adduct of the metal bisulfite and the carbonyl compound, which adduct is insoluble in the aqueous solution and therefore precipitates out, separating the precipitate from the aqueous mother liquor, and heating the separated precipitate to a temperature sufficient to decompose the adduct to the metal pyrosulfite but below the temperature at which the pyrosulfite decomposes.

PROCESS FOR RECOVERING SULFUR DIOXIDE FROM AN SULFUR DIOXIDE-CONTAINING GAS

This invention relates to an improvement in the process for recovering sulfur dioxide from gases containing same by reacting said gases with an aqueous solution of a metal sulfite such as potassium, cesium, or rubidium sulfite to produce the corresponding bisulfite, recovering the bisulfite from the solution and transforming it into the corresponding pyrosulfite and then treating the pyrosulfite to produce sulfur dioxide. More particularly, it relates to an improvement whereby the metal bisulfite is recovered from its aqueous solution and transformed into the corresponding metal pyrosulfite by contacting the metal bisulfite-containing solution with an organic carbonyl compound to precipitate out of the solution a metastable adduct of the metal bisulfite and the carbonyl compound and heating the precipitate to a temperature sufficient to decompose the adduct to the metal pyrosulfite but below the temperature at which the pyrosulfite decomposes. The improvement is particularly concerned with such a process for selectively recovering the metal bisulfite out of its aqueous solution when the solution also contains dissolved metal sulfite.

Sulfur dioxide is found in significant amounts as a constituent of many waste gases such as smelter gases, off-gases from many chemical plants, and stack or furnace gases from coal-burning furnaces such as used in electric power plants, and its concentration in such gases is from about 0.001 to less than about 0.5 mole percent (about 1 percent by weight). For example, a modern electric power plant of 1,350,000 kw. capacity will burn about 15,000 tons of coal per day. Much coal contains about 3.4 weight percent sulfur, or even more. The emission of sulfur dioxide from a plant of this size using such coal would then amount to about 1,000 tons per day, although the concentration of sulfur dioxide in the stack gases can be very low, for instance on the order of about 0.2 to 0.3 mole percent, depending upon the sulfur content of the coal.

A process directed to the recovery of $SO_2$ from such gases is disclosed in copending applications Ser. Nos. 616,682, filed Feb. 16, 1967, now abandoned and 681,775, filed Nov. 9, 1967, of Terrana et al., and Ser. No. 681,680, filed Nov. 9, 1967, of Miller et al., all of said applications having common ownership with the present application. This process provides for the recovery of sulfur present as sulfur dioxide in such small concentrations as well as in large concentrations in gases and thus provides for significant abatement of sulfur dioxide pollution of air, although it is not limited thereto. Significant amounts, for instance greater than about 75 weight percent, of sulfur dioxide can be removed from such gases.

In accordance with this invention, sulfur dioxide in the sulfur dioxide-containing gas, e.g. a waste gas, is reacted with an aqueous solution of a metal sulfite as disclosed in the above-mentioned applications. Suitable metal sulfites are the potassium, cesium, and rubidium sulfites. The reaction results in the formation of an aqueous solution of the metal bisulfite and substantial reduction of the sulfur dioxide content of the gas, for instance to less than about 0.2 mole percent in a stack gas containing more than about 0.2 mole percent. The metal bisulfite solution thus produced, which usually contains some unconverted metal sulfite as well, is added, along with an organic carbonyl compound, e.g. a ketone or an aldehyde, to an agitated vessel wherein the carbonyl compound selectively reacts with the metal bisulfite to form an insoluble adduct which precipitates from the solution. At least an equimolar amount (based on the amount of the bisulfite present) and preferably at least about a 10 percent excess, of the carbonyl compound is added to the vessel.

The temperature which is maintained in the vessel is sufficiently high to form the bisulfite-carbonyl compound adduct but not as high as the boiling point of either the carbonyl compound or water under the conditions of pressure existing in the vessel. Moreover, the adduct-forming temperature is to be kept below the temperatures at which either the metal bisulfite or the resulting adduct decomposes, whichever is lower. Most often, however, temperatures in the precipitation vessel of at least about 95° F. will be employed. While sub and superatmospheric pressures can, if desired, be employed, no advantage is known to reside in such use and, accordingly, ambient pressure conditions are preferred. Where atmospheric pressure is employed, then, the temperature in the precipitation vessel should at least be below 212° F., the boiling point of water. When using acetone, for instance, as the carbonyl compound, under atmospheric pressure in the precipitation vessel, temperatures below about 130° F., the boiling point of the acetone-water azeotrope, should be employed. Where, however, some evaporation of the components takes place, a reflux condenser may advantageously be attached to the vessel.

The precipitated adduct is removed from the precipitation vessel by any convenient means (for example, by removing the precipitate and solution as a slurry and filtering) and is heated to decompose the adduct into a metal pyrosulfite, water, and the original carbonyl compound. The filtrate which is separated from the precipitated adduct usually contains dissolved metal sulfite and, accordingly, may be recycled to the $SO_2$ absorption step. The precipitate is heated to a temperature sufficient to break down the adduct into the carbonyl compound, water and the metal pyrosulfite, but not high enough to cause disproportionation (i.e., conversion to the sulfite and $SO_2$) of the pyrosulfite formed by the decomposition of the adduct. Usually suitable are temperatures of about 275° to 350° F., especially where the metal bisulfite is potassium bisulfite and the carbonyl compound is acetone. Where relatively low temperatures are employed to break down the adduct, it is advantageous to do so under a partial vacuum. The carbonyl compound thus produced may be recycled to the precipitation vessel, usually after cooling to the desired feed temperature.

The product metal pyrosulfite may be further treated in a number of ways to recover sulfur dioxide, for instance by thermal decomposition as disclosed in the aforementioned application Ser. No. 681,680, and in Ser. No. 681,643, also filed Nov. 9, 1967, of Terrana et al. also having common ownership with the present application. And still another method of recovering the $SO_2$ from the pyrosulfite is that disclosed in applications Ser. No. 773,344, filed Nov. 4, 1968, and Ser. No. 786,756, filed Dec. 24, 1968, said applications having common ownership with the present application, which involves chemically reducing the pyrosulfite with a reducing agent such as carbon, carbon monoxide, hydrogen, or hydrogen sulfide to the corresponding metal sulfide and $SO_2$.

The carbonyl compound employed in the process of the present invention may be any organic aldehyde or ketone which forms a substantially water-insoluble, metastable adduct with the metal bisulfite. Preferably, the carbonyl compound is water-soluble and has a carbon atom content of 1 to about 5. Compounds having plural carbonyl groups, e.g., beta-diketones such as acetylacetone, as well as those possessing but one carbonyl group, can be employed. The carbonyl compound should be sufficiently soluble in the aqueous bisulfite solution to provide at least a stoichiometric amount thereof in solution, based on the amount of the bisulfite present. Unsaturated, as well as saturated, carbonyl compounds can be employed, as can keto acids such as 4-oxopentanoic acid and aldehyde acids such as oxoacetic acid. Preferably, the carbonyl oxygen will be the only nonhydrocarbonaceous portion of the compound. While aromatic ketones and aldehydes can, if sufficiently soluble, be used, the aliphatic carbonyl compounds are preferred. Especially preferred are monoalkanones of three to five carbon atoms, and monoalkanals of one to three carbon atoms, e.g., acetone, methylethyl ketone, formaldehyde and acetaldehyde. Mixtures of carbonyl compounds can be employed if desired.

The method of the present invention is generally useful for removing the aforementioned metal bisulfites from aqueous solutions containing same in up to saturated concentrations. Where the corresponding metal sulfite is also present in the solution, the method of the present invention is particularly advantageous in that it is selective for the removal of the bisulfite. As stated above, this finds particular application in the treating of spent absorbing solutions obtained from the treatment of $SO_2$-containing waste gases with aqueous solutions of potassium, cesium, or rubidium sulfite. Where the absorbing solution employed is an aqueous solution of potassium sulfite, for example, $SO_2$ is stripped from the waste gases according to the reaction:

$K_2SO_3 + SO_2 + H_2O \rightarrow 2KHSO_3$. The spent absorbing solution resulting from the reaction of an aqueous solution of one of the aforementioned metal sulfites with an $SO_2$ containing waste gas, e.g., a stack gas, contains many ingredients. The following is exemplary:

| Ingredient | Weight Percent Range | |
|---|---|---|
| | Generally | Usually |
| Metal Bisulfite | 5 to 40 | 10 to 30 |
| Metal Sulfite | 10 to 50 | 20 to 45 |
| Metal Sulfate | 0 to 8 | 1 to 6 |
| Water | balance | balance |

Removal of the bisulfite from such a solution by the method of the present invention provides a filtrate which, as indicated above, can be recycled to the $SO_2$ absorption step.

The following examples will serve to illustrate the invention.

EXAMPLE I

A 30 weight percent aqueous solution of potassium bisulfite was reacted with acetone by gradually adding the acetone to the solution at room temperature. The acetone addition caused an immediate rise in the temperature up to the boiling point of the acetone-water azeotrope. No precipitate formed until the solution had cooled slightly and the acetone concentration had reached about 25 weight percent. At this point the solution set up into an almost solid mass. The precipitated potassium bisulfite-acetone adduct was separated from the mother liquor and the pH of the latter was measured after diluting one part of the mother liquor with 99 parts by weight of water. The pH was about 8.3, indicating that substantially all of the potassium bisulfite had been removed from the solution as the potassium bisulfite-acetone adduct.

EXAMPLE II

Acetone was used to selectively remove the potassium bisulfite from an aqueous solution of mixed potassium sulfite and bisulfite. To prepare the solution, 30 g. of crude potassium sulfite and 30 g. of crude potassium pyrosulfite were mixed into 50 g. of water. The resulting mixture had a specific gravity of 1.43. Undissolved solids, including potassium sulfate which was present as an impurity in the potassium sulfite and potassium pyrosulfite, were removed by filtration. The 50 cc. of filtrate obtained, weighing about 71 g., was an aqueous solution containing about 17 wt. percent of potassium sulfite and 34 wt. percent of potassium bisulfite. (On addition to water, potassium pyrosulfite is converted to potassium bisulfite according to the reaction: $K_2S_2O_5 + H_2O \rightarrow 2KHSO_3$.)

Acetone was added to the solution in five increments of 7 cc. each. After each increment was added, a sample of the reaction mixture was removed, the sample was filtered to obtain approximately one gram of filtrate, the filtrate diluted with 99 g. of water, and the pH of the resulting, diluted filtrate determined. The pH of the diluted filtrate indicates the relative amounts of potassium sulfite and potassium bisulfite still in solution in the reaction mixture. The higher the pH (i.e., the more alkaline the solution), the greater the ratio of potassium sulfite to potassium bisulfite in the solution. The pH measurements observed for the diluted filtrate samples are reported in the following table.

TABLE

| Acetone Increment After Acetone Addition | pH of Diluted Filtrate |
|---|---|
| 0 | 6.9 |
| 1st | 7.2 |
| 2nd | 7.6 |
| 3rd | 7.75 |
| 4th | 8.3 |
| 5th | 8.4 |

After addition of all of the acetone, the resultant crystalline precipitate of potassium bisulfite-acetone adduct was filtered from the reaction mixture. After drying the crystals on a paper towel, a sample thereof was dissolved in water to a concentration of about 1 wt. percent. The initial pH of the solution of the adduct was about 5.5; after standing for about 10 minutes it dropped to about 4.3.

The potassium bisulfite-acetone adduct was dried for two days at 122° F. This material was then slowly heated in a small test tube in a sulfuric acid bath to 392° F. The evolution of both acetone and $SO_2$ was observed during the heating. The sample weighed 3.6 grams at the start and lost 1.2 grams in the process. The $SO_2$ coming off was collected in aqueous sodium carbonate solution and the latter was titrated with iodine. The sulfur dioxide amounted to 0.128 gram of the 1.2 grams lost. The pH of a 1 wt. percent aqueous solution of the final solids was 4.5 to 4.6. The $SO_2$ formed indicates the degree of disproportionation of the potassium pyrosulfite being formed as the adduct was being broken down.

EXAMPLE III

A 25 g. sample of potassium bisulfite-acetone adduct prepared as in example I was dried at 122° F. and then heated to 302° F. (as opposed to 392° F. as in example II) in a hot bath. The heating was accompanied with the evolution of acetone, which was collected in a condenser, but no discernible amount of $SO_2$. The amount of acetone collected during the heating was 4.1 g. A sample of the remaining solids was dissolved in water to a 1 wt. percent concentration. The solution had a pH of 5.6, demonstrating that the solids were primarily potassium pyrosulfite.

EXAMPLE IV

Flue gas having the following approximate composition and obtained from a coal-burning furnace is treated for recovery of $SO_2$ therefrom according to the process of the present invention:

FLUE GAS

| Ingredient | Mole Percent |
|---|---|
| Sulfur dioxide | 0.3 |
| Oxygen | 3.4 |
| Water vapor | 6.0 |
| Carbon dioxide | 14.2 |
| Nitrogen | 76.1 |
| Sulfur trioxide | 0.003 |
| Fly ash | 0.3 grain per cubic foot |

The flue gas is introduced to an $SO_2$ absorber column at a temperature of about 300° F. and a flow rate of about 2,000 actual cubic feet per minute (ACFM). Before entering the chemical absorption zone of the column, the flue gas is conducted through a scrubbing zone in the column wherein the gas is scrubbed with 0.1 gallon per minute (g.p.m.) of water to first remove other contaminants such as entrained particulate solid components, e.g., the fly ash, and more water-soluble components than the $SO_2$, e.g., the $SO_3$. Spent scrubbing water containing the removed fly ash and $SO_3$ is separated from the scrubbed gas and removed from the column. The scrubbed gas exits the scrubbing zone substantially free of the contaminants and passes into the absorption zone at a temperature of about 255° F. and a humidity of about 8 mole percent, the increased water content having been acquired in the scrubbing operation.

In the absorption zone of the column the scrubbed gas is countercurrently contacted with an aqueous absorbing solution of potassium sulfite which enters the column at a feed rate of about 68 pounds per minute and at a temperature of about 140° F. The entering absorbing solution has the following approximate composition:

ENTERING ABSORBING SOLUTION

| Ingredient | Weight Percent |
| --- | --- |
| Potassium sulfite | 30 |
| Potassium bisulfite (calculated as $K_2S_2O_5$) | 20 |
| Potassium sulfate | 2 |
| Water | 48 |

The temperatures of the scrubbed flue gas and of the entering potassium sulfite solution are high enough to maintain within the absorption zone a temperature sufficient to react the $SO_2$ in the scrubbed gas with the potassium sulfite in the absorbing solution to produce additional potassium bisulfite. Also, the flue gas vaporizes a portion of the water from the aqueous absorbing solution to provide a relative humidity of about 70 percent for the flue gas exiting the absorption column for release to the atmosphere. The absorption zone temperature is not, however, kept so high as to cause the potassium bisulfite in the absorbing solution to decompose.

The flue gas is removed from the absorption zone and conducted to a third zone of the column, a demisting zone, wherein it is finally scrubbed with a portion of the entering potassium sulfite absorbing solution in an amount sufficient to remove entrained droplets and at least a portion of the sulfur dioxide remaining in the gas. The portion of the absorbing solution used to demist the gas is, together with the material entrained therein and the $SO_2$ absorbed thereby, conducted to the absorption zone wherein it is combined with the portion of the absorbing solution employed therein.

A major portion, e.g., about 90 percent, of the $SO_2$ is removed, or stripped, from the scrubbed flue gas during its passage through the absorption and demisting zones. A spent absorbing solution is removed from the absorption zone at a temperature of about 140° F. It has the following approximate composition:

SPENT ABSORBING SOLUTION

| Ingredient | Weight Percent |
| --- | --- |
| Potassium Sulfite | 25 |
| Potassium Bisulfite (calculated as $K_2S_2O_5$) | 25 |
| Potassium Sulfate | 2 |
| Water | 48 |

The spent absorbing solution is conducted to an open mixing vessel, equipped with a stirrer, at a feed rate of about 0.12 mole per minute of potassium bisulfite. There is simultaneously fed to the mixing vessel about 0.12 mole per minute of methyl-ethyl ketone at a temperature of about 110° F. The average temperature in the vessel ranges from about 130° to about 160° F. Crystals of methyl-ethyl ketone-potassium pyrosulfite adduct are formed in the mixture.

There is continuously withdrawn from the bottom of the vessel a slurry of the crystallized adduct in its mother liquor, such withdrawal being at a rate sufficient to maintain a constant volume of contents in the vessel. The withdrawn slurry is conducted to a drum filter wherein the crystallized adduct is separated from the mother liquor, the latter being obtained as filtrate having a pH of about 8.5. The crystals are then heated in a screw conveyor to about 300° F. to drive off the methyl-ethyl ketone and water, and leave substantially pure potassium pyrosulfite. The off-gas from the screw conveyor is cooled in a condenser to about 170° F. to liquefy the water and methyl-ethyl ketone and the resultant mixture is sent to a rectifier column to recover the methyl-ethyl ketone which is recycled to the mixing vessel.

The filtrate, or mother liquor, from the drum filter, is recycled to the $SO_2$ absorber column. It has the following approximate composition:

MOTHER LIQUOR

| Ingredient | Weight Percent |
| --- | --- |
| Potassium Sulfite | 34 |
| Potassium Bisulfite (calculated as $K_2S_2O_5$) | 1 |
| Potassium Sulfate | 3 |
| Water | 62 |

The potassium pyrosulfite obtained from the screw conveyor is suitable for decomposing to produce $SO_2$, for example by dissolving the pyrosulfite in water and steam stripping the solution to recover $SO_2$.

EXAMPLE V

Employing the procedure of example IV, a spent absorbing solution of potassium bisulfite is introduced to the mixing vessel at a feed rate of about 0.12 mole of potassium bisulfite per minute, while acetaldehyde is simultaneously fed thereto at a feed rate of about 0.12 mole per minute. The product slurry of crystals of potassium bisulfite-acetaldehyde adduct in its mother liquor is further treated as in example IV.

EXAMPLE VI

Employing the procedure of example IV, an aqueous absorbing solution of cesium sulfite is used to absorb $SO_2$ from flue gas and the cesium bisulfite-containing spent absorbing solution is treated with methyl-ethyl ketone as in example IV to obtain crystallized methyl-ethyl ketone-cesium bisulfite adduct which is separated from its mother liquor and heated as in example IV to recover substantially pure cesium pyrosulfite.

EXAMPLE VII

Employing the procedure of example IV, an aqueous absorbing solution of rubidium sulfite is used to absorb $SO_2$ from flue gas and the rubidium bisulfite-containing spent absorbing solution is treated with methyl-ethyl ketone as in example IV to obtain crystallized methyl-ethyl ketone-rubidium bisulfite adduct which is separated from its mother liquor and heated as in example IV to recover substantially pure rubidium pyrosulfite.

It is claimed:

1. In a process for recovering $SO_2$ from an $SO_2$-containing gas by conducting the gas to an absorption zone and contacting it therein with an aqueous absorbing solution comprising dissolved metal sulfite selected from the group consisting of potassium sulfite, cesium sulfite, and rubidium sulfite at a temperature to absorb $SO_2$ from the gas and produce an aqueous solution of the corresponding metal bisulfite which is a precursor of $SO_2$, removing the precursor-containing solution from the absorption zone, recovering the metal bisulfite therefrom as the corresponding metal pyrosulfite, and treating the metal pyrosulfite to produce $SO_2$, the improvement wherein the metal bisulfite is recovered as the corresponding metal pyrosulfite by mixing with the precursor-containing solution in a precipitation zone an organic carbonyl compound of one to five carbon atoms to precipitate from the solution a metastable adduct of the metal bisulfite and the carbonyl compound, said mixing being conducted at a temperature below the boiling point of either the water or the carbonyl compound in the mixture, whichever is lower, and the amount of carbonyl compound mixed with the solution being at least equimolar to the amount of the metal bisulfite present, separating the precipitated adduct from the mixture, heating the separated adduct to decompose it into the carbonyl compound, water and the corresponding metal pyrosulfite, and recovering the metal pyrosulfite.

2. The improvement of claim 1 wherein the carbonyl compound is a ketone.

3. The improvement of claim 2 wherein the ketone is a monoalkanone of three to five carbon atoms.

4. The improvement of claim 3 wherein the monoalkanone is acetone.

5. The improvement of claim 3 wherein the monoalkanone is methyl-ethyl ketone.

6. The improvement of claim 3 wherein the metal is potassium.

7. The improvement of claim 4 wherein the metal is potassium.

8. The improvement of claim 5 wherein the metal is potassium.

9. The improvement of claim 3 wherein the metal is potassium, the mixing of the precursor-containing solution with the carbonyl compound is conducted at a temperature of at least about 95° F., and the heating of the separated adduct is conducted at a temperature of about 275° to 350° F.

10. The improvement of claim 9 wherein the monoalkanone is acetone.

11. The improvement of claim 9 wherein the monoalkanone is methyl-ethyl ketone.